United States Patent
Ikeda

(10) Patent No.: US 11,346,977 B2
(45) Date of Patent: May 31, 2022

(54) SECURITY SENSOR DEVICE

(71) Applicant: OPTEX CO., LTD., Shiga (JP)

(72) Inventor: Hiroyuki Ikeda, Otsu (JP)

(73) Assignee: OPTEX CO., LTD., Shiga (JP)

( * ) Notice: Subject to any disclaimer, the term of this patent is extended or adjusted under 35 U.S.C. 154(b) by 0 days.

(21) Appl. No.: 17/255,953

(22) PCT Filed: Aug. 28, 2019

(86) PCT No.: PCT/JP2019/033764
§ 371 (c)(1),
(2) Date: Dec. 23, 2020

(87) PCT Pub. No.: WO2020/054430
PCT Pub. Date: Mar. 19, 2020

(65) Prior Publication Data
US 2021/0270995 A1    Sep. 2, 2021

(30) Foreign Application Priority Data
Sep. 12, 2018  (JP) .............................. JP2018-170874

(51) Int. Cl.
*G01V 8/20* (2006.01)

(52) U.S. Cl.
CPC ..................... *G01V 8/20* (2013.01)

(58) Field of Classification Search
CPC .. G01V 8/20; G01J 5/0275; G01J 5/07; G01J 5/0846; G01J 5/0806; G01J 5/0025; G08B 29/188; G08B 13/19
See application file for complete search history.

(56) References Cited

U.S. PATENT DOCUMENTS 5,311,024 A    5/1994   Marman et al.
5,703,368 A   12/1997   Tomooka et al.
(Continued)

FOREIGN PATENT DOCUMENTS

CN     104040310 A  *  9/2014  ............ G01J 5/0022
EP      3312813 A1  *  4/2018  ............. G08B 13/19
(Continued)

OTHER PUBLICATIONS

International Search Report issued in PCT/JP2019/033764; dated Oct. 8, 2019.
(Continued)

*Primary Examiner* — Marcus H Taningco
(74) *Attorney, Agent, or Firm* — Studebaker & Brackett PC

(57) ABSTRACT

A security sensor device includes: a plurality of sensor units each of which includes an infrared ray detection element having a visual field in a predetermined target direction, the plurality of sensor units aligned in a predetermined arrangement direction; a plurality of optical systems through which detection rays transmit from a corresponding detection area to each infrared ray detection element, the plurality of optical systems aligned in the predetermined arrangement direction; a target object detection circuit into which an output signal is input from each infrared ray detection element; and a switching unit which is configured to change a configuration between each of the plurality of sensor units and the plurality of optical systems according to a user operation, so that two detections of low-place mounting detection and high-place mounting detection are respectively performed.

12 Claims, 8 Drawing Sheets

(56) References Cited

U.S. PATENT DOCUMENTS

| 7,115,871 B1 | 10/2006 | Tracy et al. | |
|---|---|---|---|
| 2010/0176300 A1 | 7/2010 | Nishikawa et al. | |
| 2017/0193782 A1* | 7/2017 | Purohit | G08B 5/36 |
| 2019/0012607 A1* | 1/2019 | Holliday | G01J 5/0025 |
| 2019/0259257 A1 | 8/2019 | Morita et al. | |

FOREIGN PATENT DOCUMENTS

| JP | H06-065991 U | 9/1994 | | |
|---|---|---|---|---|
| JP | H11-167678 A | 6/1999 | | |
| JP | 3086406 B2 | 9/2000 | | |
| JP | 2003-240865 A | 8/2003 | | |
| JP | 2009-002773 A | 1/2009 | | |
| JP | 2009-128228 A | 6/2009 | | |
| JP | 2019-144008 A | 8/2019 | | |
| WO | WO-0013153 A1 * | 3/2000 | | G06K 9/00362 |
| WO | WO-2014006388 A1 * | 1/2014 | | G01J 5/0025 |

OTHER PUBLICATIONS

The extended European search report issued by the European Patent Office dated Apr. 19, 2022, which corresponds to European Patent Application No. 19859948.2-1020 and is related to U.S. Appl. No. 17/255,953.

"Bravo 6 Dual PIR Motion Detector"; Dec. 31, 2002 (Dec. 31, 2002); XP055275732; 2 pages; Retrieved from the Internet: URL:http://cms.dsc.com/downloaded.php?t=1&id=12180 [retrieved on May 26, 2016].

* cited by examiner

HIGH-PLACE MOUNTING

LOW-PLACE MOUNTING (1)

SECURITY SENSOR DEVICE

RELATED APPLICATION

This application is based on and claims Convention priority to Japanese patent application No. 2018-170874, filed Sep. 12, 2018, the entire disclosure of which is herein incorporated by reference as a part of this application.

TECHNICAL FIELD

The present invention relates to a security sensor device having a detecting means for detecting detection rays.

BACKGROUND ART

Conventionally, known is a security sensor device including an active type infrared security sensor (AIR (Active Infra-Red) sensor) which has one or more pairs of a projector and a receiver for detection rays that are electromagnetic waves such as infrared rays and which detects an object by using infrared rays that have been projected and subsequently shielded on the object, or a passive type infrared security sensor (PIR (Passive Infra-Red) sensor) which detects, as detection rays, infrared rays emitted from a creature or a human body that is a detection object.

The two following conventional arts (1) and (2) are known as a security sensor device including a PIR sensor.

(1) [A passive type infrared ray human body detection device including: two sensor units each having a vertically two-stage configuration and having an infrared ray detection element with a field of view (FOV) of about 90 degrees in a horizontal direction; an optical system such as a semi-cylindrical Fresnel lens including a plurality of integrated lens pieces; and a human body detection circuit to which output signals from each of the sensor units are input (PTL 1)]

In the passive type infrared ray human body detection device, the human body detection circuit has a logical product (AND) circuit that outputs a human body detection signal, which includes a signal indicating detection of a human body that is a detection target, when output signals are input from the upper and lower sensor units. Hereinbelow, to detect a detection target by a logical product (AND) circuit by receiving output signals from a plurality of sensor units (infrared ray detection elements) is referred to as detection by a logical product (AND) operation.

The passive type infrared ray human body detection device has a configuration supposed to be mounted at a low place of a height of the upper body of a person or a height or lower of a person (typically, a height from the waist to the chest of a person), for example, so as to detect a human body in a horizontal range of about 12 m (this detection is referred to as low-place mounting detection). That is, the upper unit of the vertically two-stage sensor units receives detection rays (referred to as horizontal direction detection rays) from one detection area in the substantially horizontal direction (specifically, from a detection target in the detection area), and the lower unit receives detection rays (referred to as lower detection rays) from one detection area below the horizontal direction. By this configuration, both the upper and lower units receive the horizontal direction detection rays and the lower detection rays emitted from the human body and output the signals, and the signals are input, so that a human body detection signal that is an output from the human body detection circuit (AND circuit) is output. On the other hand, in the passive type infrared ray human body detection device, for example, a high-temperature generation source such as a distant boiler is detected by the upper unit but is not detected by the lower unit. In addition, a small animal such as a dog and a temperature rise of the ground are detected by the lower unit but are not detected by the upper unit. In this way, the passive type infrared ray human body detection device can exclude false detection by the above configuration including the AND circuit of the human body detection circuit, thereby detecting a human body with accuracy.

(2) [A passive type infrared ray human body detection device including one infrared ray detection element and having a function of switching a mounting mode to receive horizontal direction detection rays when mounted at a low place (this detection is low-place mounting detection) and switching a mounting mode to receive a plurality of lower detection rays from a plurality of lower detection areas (this detection is referred to as high-place mounting detection and the detection rays are referred to as high-place detection rays) so as to allow detection from a distant place to a short distance within a rated distance of a sensor when mounted at a high place of a height higher than about a height of a person (typically, a range from about 2 m to 3 m, more preferably a height of about 2 m such as overhead or under eaves), for example]

For example, in a horizontal range of about 12 m, the passive type infrared ray human body detection device can detect a human body with excluding detection of a small animal by detecting a detection area in a substantially horizontal direction at a predetermined height in the low-place mounting detection, and can detect both a small animal and a human body or a human body except a small animal in the high-place mounting detection. Note that, the high-place detection rays may also include the horizontal direction detection rays.

The passive type infrared ray human body detection device corresponds to a detection device of model No. LX-402 (referred to as a single element two-mode detection device) available from OPTEX Co., Ltd. including: one infrared ray detection element with a field of view of about 90 degrees in the horizontal direction; two upper and lower optical systems such as semi-cylindrical Fresnel lenses each having a plurality of integrated lens pieces; a visual field restriction plate that blocks a part of a visual field of the infrared ray detection element; and a secondary mirror that can reflect detection rays. In the single element two-mode detection device, when switching the mounting mode, a predetermined inner cover is slide in an upper and lower direction, so that a position of the infrared ray detection element changes in the upper and lower direction.

Before the upward change in position is performed, the infrared ray detection element detects the horizontal direction detection rays that have transmitted through one of the two optical systems, and the single element two-mode detection device can implement the low-place mounting detection. At this time, the visual field restriction plate blocks a part of the visual field of the infrared ray detection element so that the single element two-mode detection device cannot detect detection rays (these detection rays are the lower detection rays) that have transmitted through the other of the two optical systems. Note that, when the upward change in position is performed, the visual field restriction plate does not block a part of the visual field of the infrared ray detection element and the position of the infrared ray detection element moves upward with respect to each of the optical systems, so that the single element two-mode detection device can implement the high-place mounting detection. At this time, detection rays that have transmitted each of the two optical systems reach the infrared ray detection element, so that the infrared ray detection element performs detection in the two lower detection areas. The two types of the detection rays become the lower detection rays because the position of the infrared ray detection element has moved upward with respect to each of the optical systems.

In the high-place mounting, in addition to the sliding of the inner cover, the secondary mirror is manually moved so as to overlap a part of the visual field of the infrared ray detection element, specifically, an upper part of the visual field. In this way, by moving the secondary mirror so as to be included in the upper part of the visual field of the infrared ray detection element, the detection rays that pass through the upper part are reflected by the secondary mirror. Thereby, one detection area in the closest vicinity below the single element two-mode detection device can be further included in the upper part of the visual field, so that the lower closest vicinity can be detected. In this way, in the high-place mounting detection, the detection is performed in the three lower detection areas.

As described above, in the single element two-mode detection device, the infrared ray detection element has a positional relation with the Fresnel lens where the detection direction is one detection area in the substantially horizontal direction when mounted at a low place, and has a positional relation with the Fresnel lens, the secondary mirror and the visual field restriction plate where the detection direction is multiple, i.e., faces toward the directions of the three lower detection areas when mounted at a high place. That is, one single element two-mode detection device realizes the high-place mounting detection and the low-place mounting detection by one device. In the high-place mounting detection, as described above, the visual field of the infrared ray detection element is divided by position movement, the secondary mirror and the visual field restriction plate, and one original detection area is divided into the plurality of (three) areas in the far and near direction where it is necessary to detect a plurality of detection areas in far and near directions. The small areas that are formed by dividing one original detection area into the plurality of areas are referred to as divided detection areas. Note that, a sum of sizes of the plurality of divided detection areas may be different from a size of one original detection area.

CITATION LIST

Patent Literature

PTL 1: Japanese Patent No. 3,086,406

SUMMARY OF INVENTION

Technical Problem

However, the passive type infrared ray human body detection device of the conventional art (1) has a configuration supposed to perform the low-place mounting detection. Therefore, even though the visual field is made to face toward the ground simply by mounting the passive type infrared ray human body detection device at a high place, it is not possible to perform the high-place mounting detection with high reliability. For example, in the passive type infrared ray human body detection device, there are only two detection areas corresponding to the two sensor units. Therefore, a range in which human body detection can be accurately implemented by using the AND operation is limited to a range that is one place in the vicinity of a boundary between the detection areas. As a result, a detectable range is narrowed in the rated distance of the sensor, i.e., a warning area becomes more missing, making it easier to intrude and lowering reliability.

In the meantime, the single element two-mode detection device of the conventional art (2) performs detection with only one infrared ray detection element. Therefore, in the low-place mounting detection, it is not possible to exclude false detection due to detection of the distant high-temperature generation source, and the accuracy of excluding detection of a small animal is lower than the passive type infrared ray human body detection device of the conventional art (1). In addition, in the high-place mounting detection, it is not possible to exclude a possibility of false detection due to temperature rise of the ground, which lowers the accuracy.

It is therefore an object of the present invention to provide a security sensor device that can implement high-place mounting detection and low-place mounting detection by one device and detect a human body with accuracy with excluding false detection, in order to eliminate the above drawbacks of the conventional art.

Solution to Problem

As a result of conducting various studies, the present inventor has found that the above object is achieved by the following invention.

A security sensor device according to the present invention is a security sensor device including:

a plurality of sensor units each of which includes an infrared ray detection element having a visual field in a predetermined target direction, the plurality of sensor units aligned in a predetermined arrangement direction;

a plurality of optical systems through which detection rays transmit from a corresponding detection area to each infrared ray detection element, the plurality of optical systems aligned in the predetermined arrangement direction;

a target object detection circuit into which an output signal is input from each infrared ray detection element, the target object detection circuit configured to output a target object detection signal including a signal indicating detection of a detection target based on each output signal; and a switching unit which is configured to change a configuration between each of the plurality of sensor units and the plurality of optical systems according to a user operation, so that two detections of low-place mounting detection and high-place mounting detection are respectively performed, the low-place mounting detection in which the security sensor device is mounted at a low place equal to or lower than a predetermined height and human body detection is performed, the high-place mounting detection in which the security sensor device is mounted at a place higher than the predetermined height and human body detection is performed.

According to the above configuration, since the security sensor device according to the present invention includes the switching unit configured to change (or switch) a configuration between each of the plurality of sensor units and the plurality of optical systems according to a user operation so that the two detections of the low-place mounting detection and the high-place mounting detection are respectively performed, it is possible to implement the high-place mounting detection and the low-place mounting detection by one device. In addition, since the security sensor device according to the present invention includes the target object detection circuit configured to perform detection of a human body and the like and to output a target object detection signal including a signal indicating detection of the detection target, based on the output signal from the infrared ray detection element of each of the plurality of sensor units, it is possible to accurately detect the human body with excluding false detection.

In the above configuration, preferably, the security sensor device further includes a visual field restriction member which is configured to block a part of the visual field of the predetermined infrared ray detection element, and the switching unit is configured to perform a first operation of positioning the infrared ray detection element at a first position and arranging the visual field restriction member at a position at which the visual field of the infrared ray detection element is not blocked to change a positional correspondence between the detection rays transmitting the optical system and the infrared ray detection element on which the detection rays are incident, by changing a relative position in the predetermined arrangement direction between the infrared ray detection element and the visual field restriction member. Thereby, upon switching from the high-place mounting detection to the low-place mounting detection or from the low-place mounting detection to the high-place mounting detection, the switching unit positions the infrared ray detection element at the first position and arranges the visual field restriction member at the position at which the visual field of the infrared ray detection element is not blocked. By the change in position and the arrangement, it is possible to perform detections of a plurality of detection areas in far and near directions, in the high-place mounting detection. Therefore, depending on the change in position between the infrared ray detection element and the visual field restriction member, and the presence or absence of the effect of blocking the detection rays by the visual field restriction member, it is possible to switch the detection rays to any one of horizontal direction detection rays, lower detection rays and high-place detection rays with respect to the infrared ray detection element, and to switch the high-place mounting detection and the low-place mounting detection by one security sensor device.

In the above configuration, preferably, the switching unit is configured to perform the positioning and the changing of the correspondence at the same time in the first operation according to the user operation. In a case of performing the operation of positioning the infrared ray detection element at the first position and the operation of changing of the correspondence of arranging the visual field restriction member at the position at which the visual field of the infrared ray detection element is not blocked by a user's manual operation, if the user forgets one of the operations, the security sensor device cannot exhibit the effect of switching the high-place mounting detection and the low-place mounting detection by one device. Therefore, the switching unit performs the positioning and the changing of the correspondence at the same time in the first operation, thereby avoiding the forgetfulness. In addition, it is possible to solve a troublesome that the user should perform the two operations of the operation of positioning the infrared ray detection element at the first position and the operation of the change of the correspondence of arranging the visual field restriction member at the position at which the visual field of the infrared ray detection element is not blocked.

In the above configuration, preferably, the security sensor device includes a plurality of the sensor units each configured to be switched by the switching unit to perform the first operation, and the switching unit is configured to perform the first operations of the plurality of sensor units at the same time according to the user operation. In this case, the plurality of sensor units becomes only the sensor units each of which is switched by the switching unit and performs the first operation. In a case of performing each of the first operations by the user's manual operation, if the user forgets one of the first operations, the security sensor device cannot exhibit the effect of accurately detecting the human body with excluding the false detection while exhibiting the effect of switching the high-place mounting detection and the low-place mounting detection by one device, or the effect is lowered. Therefore, the switching unit performs each of the first operations at the same time, thereby avoiding the forgetfulness. In addition, it is possible to solve a troublesome that the user should perform each of the first operations.

In the above configuration, preferably, the security sensor device further includes a secondary mirror for reflecting the detection rays, and the switching unit is configured to perform a second operation of positioning the infrared ray detection element at a second position and arranging the secondary mirror at a position included in the visual field of the infrared ray detection element to change a positional correspondence between the detection rays transmitting the optical system and the infrared ray detection element on which the detection rays are incident, by changing a relative position in the predetermined arrangement direction between the infrared ray detection element and the secondary mirror. Thereby, upon switching from the high-place mounting detection to the low-place mounting detection or from the low-place mounting detection to the high-place mounting detection, the switching unit positions the infrared ray detection element at the second position and arranges the secondary mirror at the position included in the visual field of the infrared ray detection element. By the change in position and the arrangement, it is possible to perform detections of the plurality of detection areas in the far and near directions, in the high-place mounting detection. Therefore, depending on the change in position between the infrared ray detection element and the visual field restriction member, and the presence or absence of the secondary mirror in the visual field of the infrared ray detection element, it is possible to switch the detection rays to any one of horizontal direction detection rays, lower detection rays and high-place detection rays with respect to the infrared ray detection element, and to switch the high-place mounting detection and the low-place mounting detection by one security sensor device.

In the above configuration, preferably, the switching unit is configured to perform the positioning and the changing of the correspondence at the same time in the second operation according to the user operation. In a case of performing the operation of positioning the infrared ray detection element at the second position and the operation of changing of the correspondence of arranging the secondary mirror at the position included in the visual field of the infrared ray detection element by a user's manual operation, if the user forgets one of the operations, the security sensor device cannot exhibit the effect of switching the high-place mounting detection and the low-place mounting detection by one device. Therefore, the switching unit performs the positioning and the changing of the correspondence at the same time in the second operation, thereby avoiding the forgetfulness. In addition, it is possible to solve a troublesome that the user should perform the two operations of the operation of positioning the infrared ray detection element at the second position and the operation of the change of the correspondence of arranging the secondary mirror at the position included in the visual field of the infrared ray detection element.

In the above configuration, preferably, the security sensor device includes a plurality of the sensor units each configured to be switched by the switching unit to perform the second operation, and the switching unit is configured to perform the second operations of the plurality of sensor units at the same time according to the user operation. In this case, the plurality of sensor units becomes only the sensor units each of which is switched by the switching unit and performs the second operation. In a case of performing each of the second operations by the user's manual operation, if the user forgets one of the second operations, the security sensor device cannot exhibit the effect of accurately detecting the human body with excluding the false detection while exhibiting the effect of switching the high-place mounting detection and the low-place mounting detection by one device, or the effect is lowered. Therefore, the switching unit performs each of the second operations at the same time, thereby avoiding the forgetfulness. In addition, it is possible to solve a troublesome that the user should perform each of the second operations.

In the above configuration, preferably, the security sensor device further includes a visual field restriction member configured to block a part of the visual field of the predetermined infrared ray detection element, and a secondary mirror for reflecting the detection rays, and the switching unit is configured to perform a first operation of positioning the infrared ray detection element at a first position and arranging the visual field restriction member at a position at which the visual field of the infrared ray detection element is not blocked to change a positional correspondence between the detection rays transmitting the optical system and the infrared ray detection element on which the detection rays are incident, by changing a relative position in the predetermined arrangement direction between the infrared ray detection element and the visual field restriction member, to perform a second operation of positioning the infrared ray detection element at a second position and arranging the secondary mirror at a position included in the visual field of the infrared ray detection element to change a positional correspondence between the detection rays transmitting the optical system and the infrared ray detection element on which the detection rays are incident, by changing a relative position in the predetermined arrangement direction between the infrared ray detection element and the secondary mirror, and to perform the first operation and the second operation at the same time according to the user operation. Note that, the above configuration may include a configuration where the sensor unit configured to be switched by the switching unit to perform the first operation is provided singularly or in plural and a configuration where the sensor unit configured to be switched by the switching unit to perform the second operation is provided singularly or in plural.

In the above configuration, at least one of the plurality of sensor units becomes a sensor unit that is switched by the switching unit and performs the first operation, and at least one of the other sensor units becomes a sensor unit that is switched by the switching unit and performs the second operation. In a case of performing each of the first operation and the second operation by a user's manual operation, if the user forgets one of the operations, the security sensor device cannot exhibit the effect of accurately detecting the human body with excluding the false detection while exhibiting the effect of switching the high-place mounting detection and the low-place mounting detection by one device, or the effect is lowered. Therefore, the switching unit performs the first operation and the second operation at the same time, thereby avoiding the forgetfulness. In addition, it is possible to solve a troublesome that the user should perform each of the first operation and the second operation.

In addition, since both types of the sensor unit configured to perform the first operation and the sensor unit configured to perform the second operation are provided, it is possible to address further accurate detection by using features of each of the sensor units. Here, an arrangement order of the sensor unit configured to perform the first operation and the sensor unit configured to perform the second operation in the predetermined arrangement direction are arbitrary as long as both types of the sensor units are included. Note that, in the above configuration, the switching unit may also be configured to perform the positioning and the changing of the correspondence at the same time in the first operation and the second operation according to the user operation.

By the change in position and the arrangement, it is possible to perform detections of the plurality of detection areas in the far and near directions, in the high-place mounting detection. Therefore, depending on the change in position between the infrared ray detection element and the visual field restriction member, and the presence or absence of the effect of blocking the detection rays by the visual field restriction member, it is possible to switch the detection rays to any one of horizontal direction detection rays, lower detection rays and high-place detection rays with respect to the infrared ray detection element. Also, depending on the change in position between the infrared ray detection element and the visual field restriction member, and the presence or absence of the secondary mirror in the visual field of the infrared ray detection element, it is possible to switch the detection rays to any one of horizontal direction detection rays, lower detection rays and high-place detection rays with respect to the infrared ray detection element, and to switch the high-place mounting detection and the low-place mounting detection by one security sensor device.

In the above configuration, preferably, the infrared ray detection element can move to a predetermined position in the corresponding sensor unit according to a user operation, and when the first operation or the second operation is performed according to the user operation, the infrared ray detection element moves from the predetermined position to the first position or the second position. Since the infrared ray detection element can be moved to a predetermined position in the sensor unit by a slide knob or the like, which will be described later, a detection distance can be finely adjusted according to the predetermined position. In addition, when a plurality of operations including one or both of the first operation and the second operation is performed, since the infrared ray detection element moves from the predetermined position to the first position or the second position, it is possible to perform all of the operations without forgetting the same. In addition, it is possible to solve a troublesome that the user should perform all of the operations including one or both of the first operation and the second operation.

In the above configuration, preferably, the visual field restriction member is a part of a cylindrical surface or a part of a polygonal tube, and is arranged at a position closer to the optical systems than the infrared ray detection element. Thereby, a form close to a shape of the optical system can be made, and an influence of diffraction of the detection rays, which depends on a distance, by the visual field restriction member on the optical system can be reduced.

In the above configuration, preferably, the change in relative position that occurs multiple times includes changes in position having different magnitudes. Thereby, in the plurality of sensor units, the change in relative position of the infrared ray detection element in the first operation or the second operation in one sensor unit can be made different from the change in relative position of the infrared ray detection element in the first operation or the second operation in another sensor unit. That is, for example, in a case where one sensor unit is a sensor unit configured to perform the first operation (the visual field restriction member is used) and another sensor unit is a sensor unit configured to perform the second operation (the secondary mirror is used), since a moving distance in the change in relative position of the infrared ray detection element in the first operation and a moving distance in the change in relative position of the infrared ray detection element in the second operation are mainly different from each other, it is possible to address the different moving distances.

Note that, when positioning the infrared ray detection element at the first position and arranging the visual field restriction member at the position at which the visual field of the infrared ray detection element is not blocked or positioning the infrared ray detection element at the second position and arranging the secondary mirror at the position included in the visual field of the infrared ray detection element, only the infrared ray detection element may be moved, only the visual field restriction member or the secondary mirror may be moved or both the infrared ray detection element and the visual field restriction member or the secondary mirror may be moved. When both the infrared ray detection element and the visual field restriction member or the secondary mirror are moved, it is possible to make movement over a desired distance even though each moving distance is small. Thereby, for example, it is possible to downsize the device in the predetermined arrangement direction.

In the above configuration, preferably, the visual field restriction member and the secondary mirror are integrated. Thereby, it is possible to exclude a useless gap between the visual field restriction member and the secondary mirror, so that, for example, it is possible to downsize the device in the predetermined arrangement direction. In the integration of the visual field restriction member and the secondary mirror, they may be configured with the same member by integral molding or the like or the visual field restriction member and the secondary mirror may be bonded to configure one member.

Any combination of at least two configurations disclosed in the appended claims and/or the description and/or the drawings is included in the present invention. In particular, any combination of two or more of the appended claims is also included in the present invention.

BRIEF DESCRIPTION OF DRAWINGS

The present invention will become more clearly understood from the following description of preferred embodiments thereof, when taken in conjunction with the accompanying drawings. However, the embodiments and the drawings are given only for the purpose of illustration and explanation, and are note used so as to determine the scope of the present invention. The scope of the present invention is determined by the appended claims. In the accompanying drawings, like reference numerals are used to denote like or equivalent parts throughout the several views.

DESCRIPTION OF EMBODIMENTS

Figure 1:
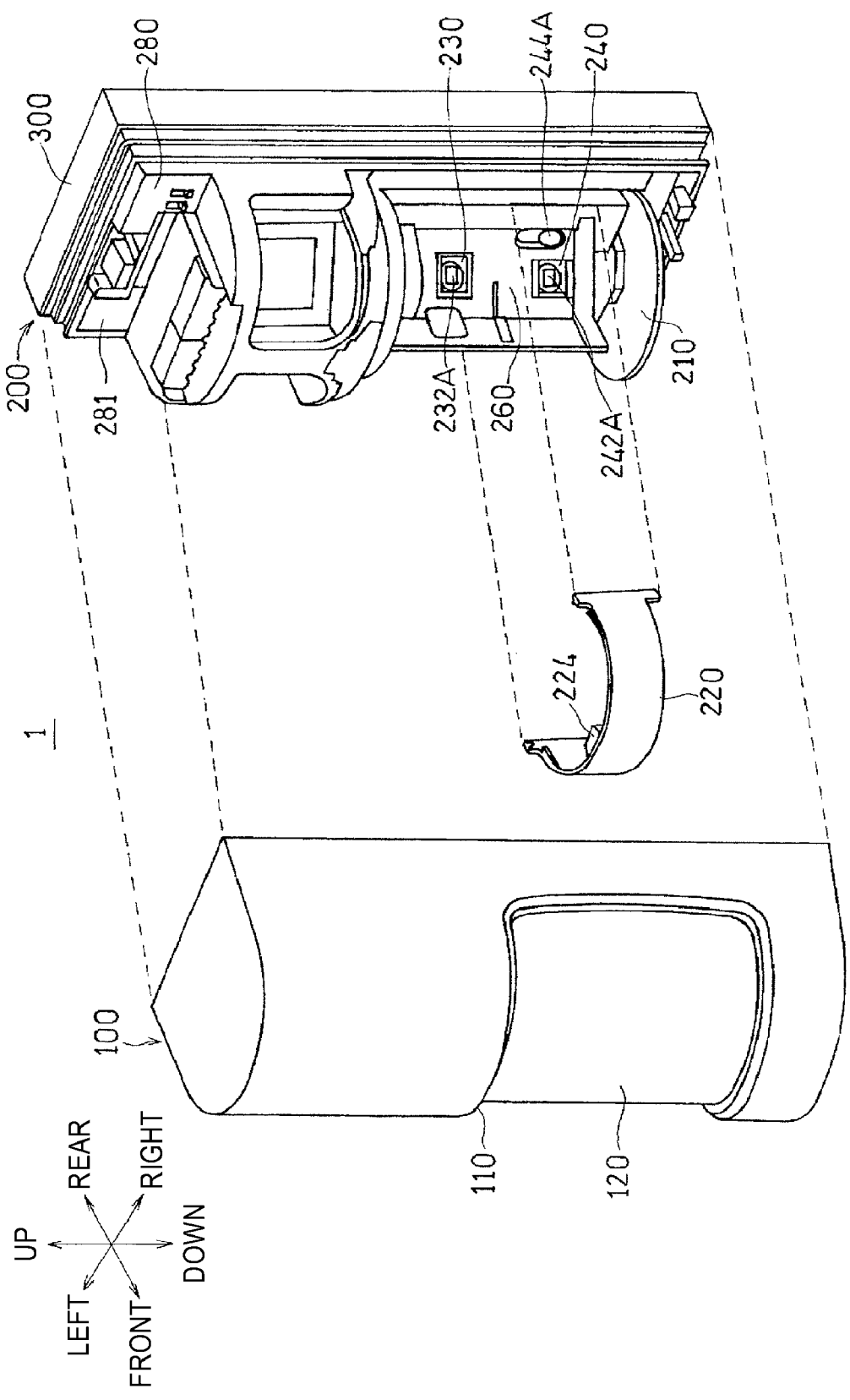
FIG. 1 is an exploded perspective view of a security sensor device according to one embodiment of the present invention.

Hereinbelow, embodiments of the present invention will be described with reference to the drawings. Note that, in each drawing, like reference numerals denote like or equivalent parts, and the description thereof is omitted as appropriate unless change or the like is described otherwise.

FIG. 1 is an exploded perspective view of a security sensor device 1 according to one embodiment of the present invention. In the present embodiment, infrared rays, particularly, far-infrared rays (hereinbelow, collectively referred to as infrared rays) are used as detection rays. The security sensor device 1 includes, as detection ray sensors, infrared ray detection elements 232A, 232B, 242A and 242B, which are PIR sensors having a visual field in a predetermined target direction, and is used for detection of a human body indoor or outdoor that is a detection target, i.e., detection of an intruder and the like. As used herein, the predetermined target direction is a direction of a detection area in which a user desires detection of the detection target, for example. An outer shape of the security sensor device 1 is a substantially semicircular column shape, and has a shape consisting of a curve-shaped part including an arc and three linear parts, as seen from above. The security sensor device 1 includes a cover unit 100, and a base unit 200 including a mount 300 for mounting to a wall and the like. The security sensor device 1 further includes a visual field restriction member 220 that is mounted to a main body 210 of the base unit 200. The mount 300 can be mounted to a pillar, a wall, or the like by means of mounting tools such as screws. The cover unit 100 covers a front face of the base unit 200, i.e., a face facing a detection target, and the visual field restriction member 220 is mounted to the front face of the base unit 200 and is disposed in the cover unit 100.

Figure 2:
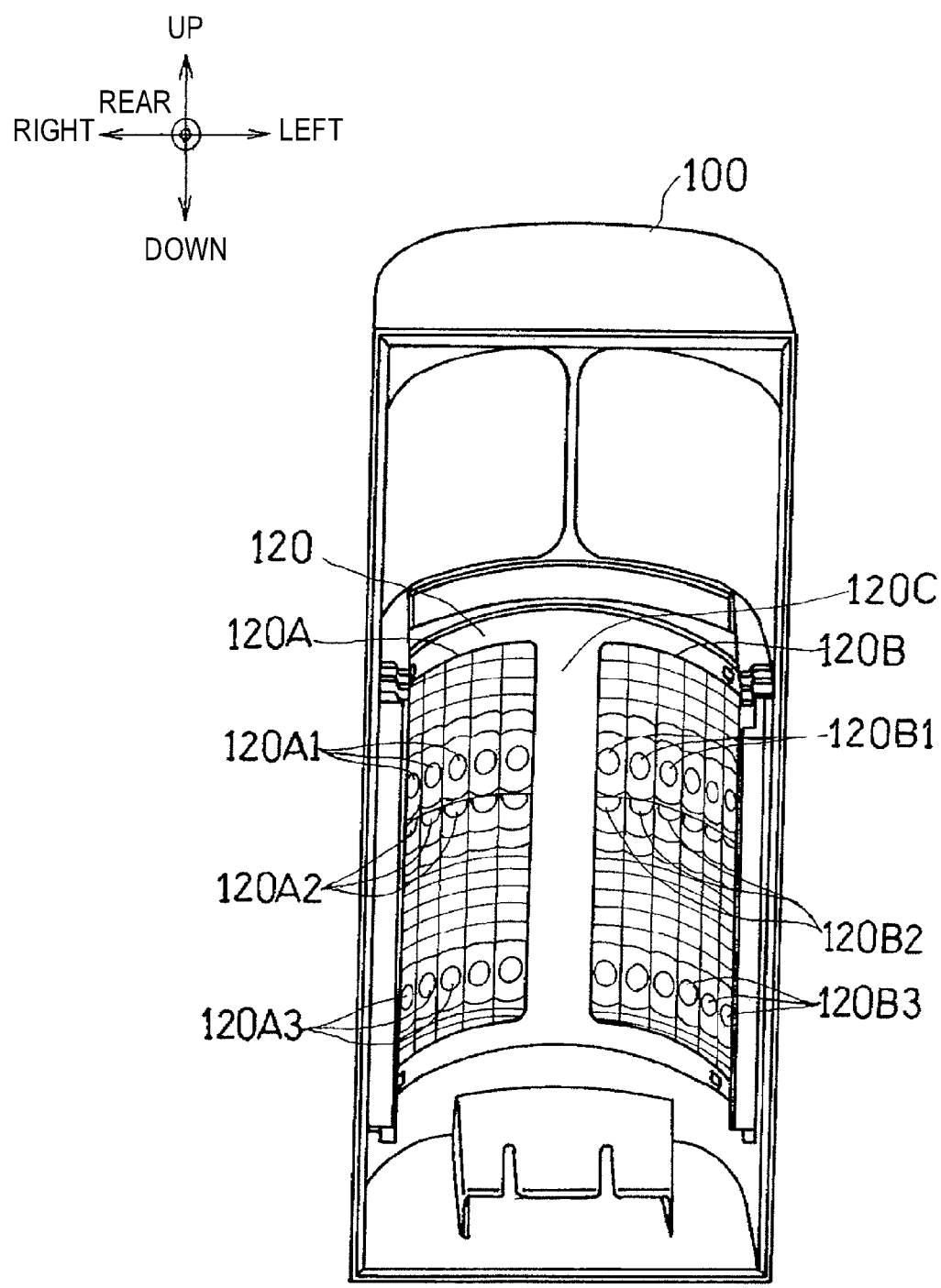
FIG. 2 is a perspective top view of a cover unit of the security sensor device.

The cover unit 100 has a detection lens 120 through which detection rays transmit from a corresponding detection area to each of the infrared ray detection elements 232A, 232B, 242A and 242B. An opening 110 is provided in a lower half part of the cover unit 100 and closed by the detection lens 120. As shown in a perspective top view of the cover unit 100 seen from an inner side in FIG. 2A, the detection lens 120 is an optical member having a high infrared ray transmittance, and has lens parts 120A and 120B disposed from the right toward the left, and a connection part 120C present therebetween. The connection part 120C has a substantially rectangular flat surface or a slightly curved surface. The detection lens 120 is formed in a shape where the lens parts 120A and 120B and the connection part 120C are integrated with each other, which will be described later, and the lens parts 120A and 120B and the connection part 120C form a uniform surface in which boundaries among the lens parts 120A and 120B and the connection part 120C are not recognized from the outer shape of the security sensor device 1. The detection lens 120 is a material having good transmittance for a wavelength range of electromagnetic waves used as detection rays (infrared rays, particularly, far-infrared rays in the present embodiment), and is, for example, a polyethylene resin.

Each of the lens parts 120A and 120B is a multi-segment lens including a plurality of rectangular lens pieces integrated aligned adjacent to each other right and left and each having a length direction, which is an upper and lower direction that is a predetermined arrangement direction. In the lens pieces, a plurality of Fresnel lenses (an example of three Fresnel lenses in the present embodiment) is aligned in the same direction (i.e., the upper and lower direction). In the present embodiment, a plurality of optical systems aligned in the predetermined arrangement direction refers to three Fresnel lenses that are present in the right and left direction by any number (the number of lens pieces) and are aligned in the upper and lower direction. In each of the lens parts 120A and 120B, as the three Fresnel lenses, Fresnel lenses 120A1, 120A2 and 120A3 and Fresnel lenses 120B1, 120B2 and 120B3 are each aligned in corresponding order from above.

Figure 3:
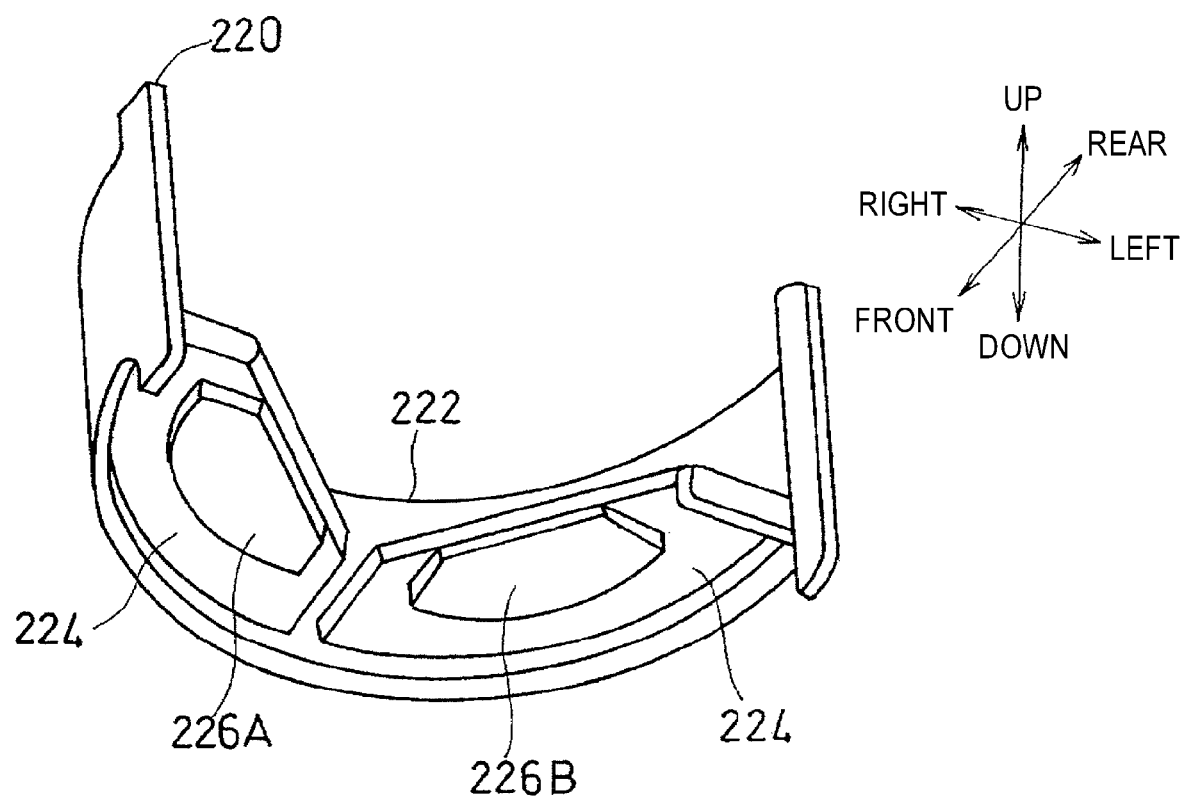
FIG. 3 is a perspective bottom view of a visual field restriction member and a secondary mirror of the security sensor device.

The visual field restriction member 220 in FIG. 1 is configured to block a part of a visual field of a predetermined infrared ray detection element. The visual field restriction member 220 has a shape of a part of a cylindrical surface or a part of a polygonal tube so as to be close to a shape of the optical systems 120A1-A3 and 120B1-B3, which have a shape having a semicircular cross section in the horizontal direction or a shape having a curved-shaped part and linear parts as seen from above, as described above. Due to the above shape, the visual field restriction member 220 can be disposed at a position closer to the detection lens 120 than the infrared ray detection elements 232A, 232B, 242A and 242B when the cover unit 100, the base unit 200 and the visual field restriction member 220 are combined. In the present embodiment, the visual field restriction member 220 has a shape of a part of a cylindrical surface. In the present embodiment, the visual field restriction member 220 also has a shape where two flat plate-shaped reinforcement members 224 each having a shape cut in the vicinity of a center of a fan shape are disposed adjacent to each other inside of a semicircular part 222 with no cover and bottom, as shown in a perspective bottom view of FIG. 3. On backsides (lower parts) of the reinforcement member 224, two secondary mirrors 226A and 226B, which will be described later, are each provided, and the visual field restriction member 220 and the secondary mirrors 226A and 226B are integrated by bonding, for example.

The base unit 200 shown in FIG. 1 has a main body 210 detachably mounted thereto, and a human body detection circuit 280 that is a target object detection circuit housed in the main body 210. The human body detection circuit 280 is input with output signals from each of the infrared ray detection elements 232A, 232B, 242A and 242B shown in FIG. 5 and is configured to output a human body detection signal, which includes a signal indicating detection of a human body that is the detection target, based on each of the output signals. Specifically, the human body detection circuit 280 has a logical product (AND) circuit configured to perform a logical product (AND) operation of output signals of the infrared ray detection element 232A and the infrared ray detection element 242A whose detection center directions (which will be described later) are substantially the same in the right and left direction, as described later. Therefore, when the infrared ray detection element 232A and the infrared ray detection element 242A each output an output signal indicating detection of a human body that is the detection target at substantially the same time, for example, the human body detection circuit 280 outputs a human body detection signal that is a signal indicating the detection of a human body. Similarly, the human body detection circuit 280 has a logical product (AND) circuit configured to perform a logical product (AND) operation of output signals of the infrared ray detection element 232B and the infrared ray detection element 242B whose detection center directions are substantially the same in the right and left direction, and performs a similar operation to the infrared ray detection elements 232A and 242A. The human body detection circuit 280 is housed in a PCB housing part 281 present above the main body 210 in the base unit 200, for example.

In the present embodiment, two upper and lower sensor units (a first sensor unit 230 and a second sensor unit 240) each having the infrared ray detection elements 232A and 232B and the infrared ray detection elements 242A and 242B are mounted to the main body 210. In the present embodiment, the first sensor unit 230 and the second sensor unit 240 are aligned in corresponding order from above.

Figure 5:
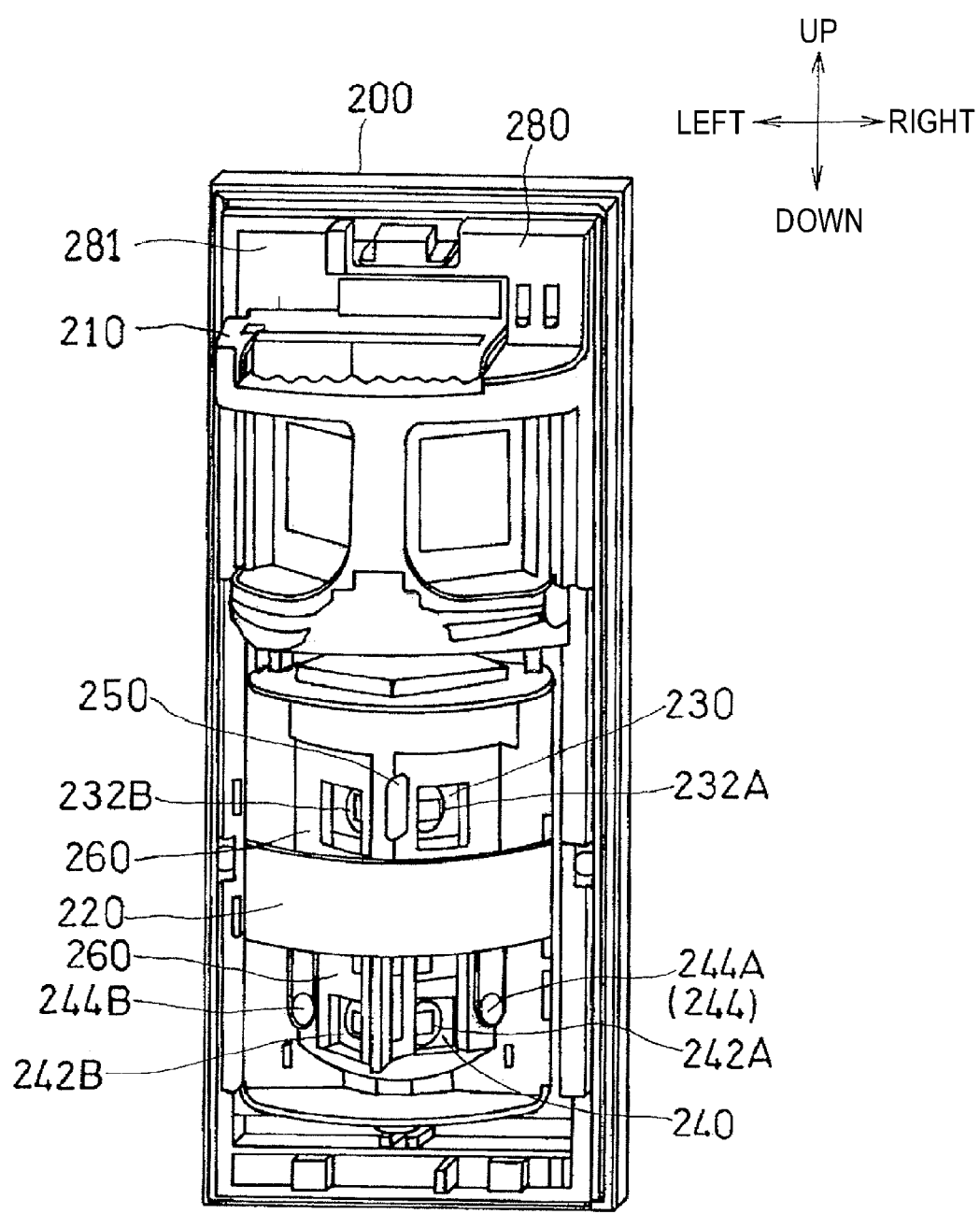
FIG. 5 is a perspective top view of the base unit of the security sensor device (in a case of low-place mounting).
Figure 6A:
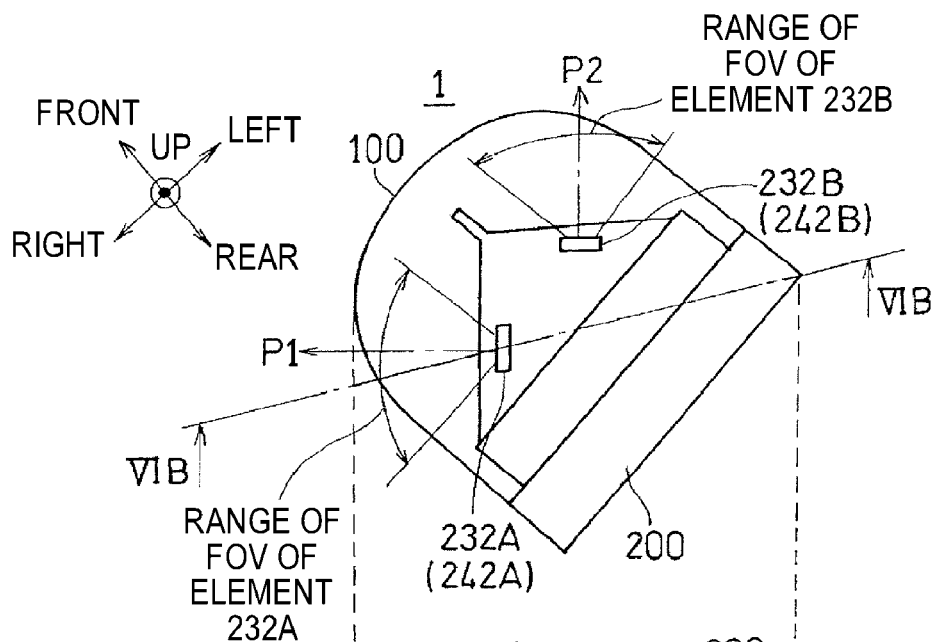
FIG. 6A is a plan view for illustrating high-place mounting detection of the security sensor device.
Figure 6B:
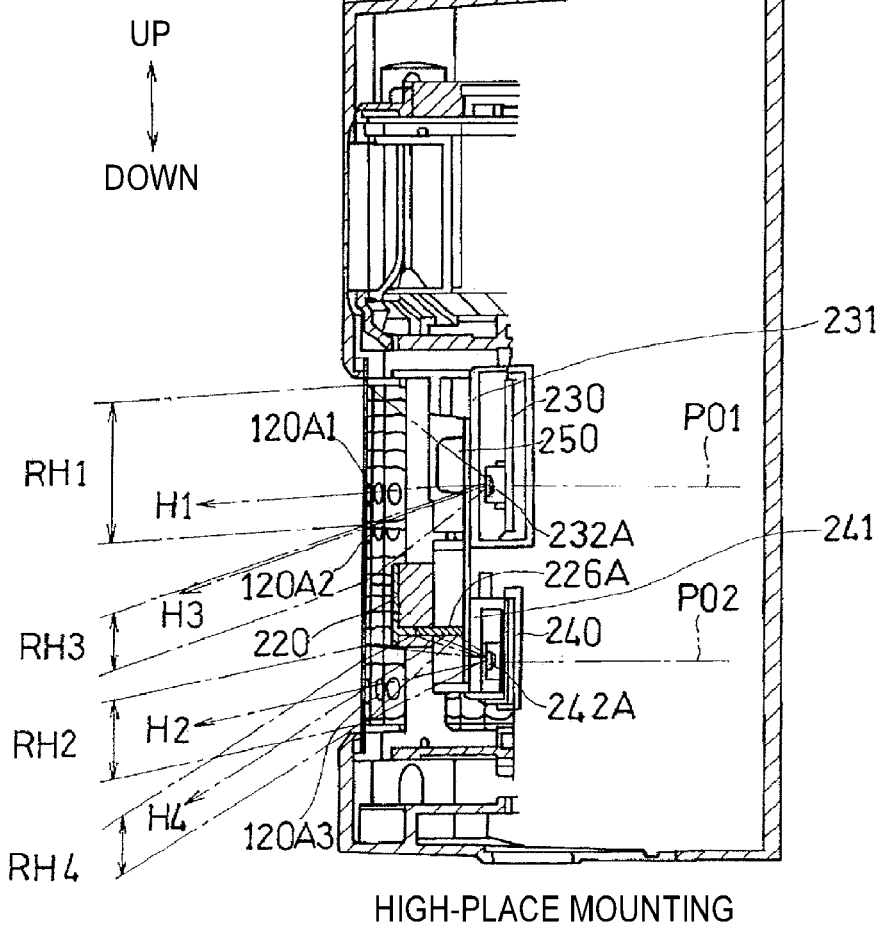
FIG. 6B is a sectional view taken along a line VIB-VIB in FIG. 6A.

As for the first sensor unit 230, the infrared ray detection elements 232A and 232B each having a FOV (field of view) of 90 degrees as shown in FIG. 6A are housed and fixed in a single metal case 231 shown in FIG. 6B. The first sensor unit 230 is covered and held with a single case 260 having a substantially triangular column shape shown in FIG. 4 or 5. The infrared ray detection elements 232A and 232B are arranged such that detection center directions P1 and P2 thereof (FIG. 6A) form 90 degrees, and specifically, are arranged so as to face outwardly on two sides excluding the hypotenuse of a right-angled isosceles triangle on a cross-section orthogonal to the upper and lower direction. As used herein, the detection center directions are each a direction straight facing the infrared ray detection element, a direction of substantially the center of the FOV of the infrared ray detection element, or a direction in which detection sensitivity is highest. Thereby, the total FOV of the two infrared ray detection elements 232A and 232B is 180 degrees. Note that, in the present embodiment, the first sensor unit 230 and the infrared ray detection elements 232A and 232B are fixed so as not rotate with respect to the base unit 200. The first sensor unit 230 is also configured to be movable vertically with respect to the base unit 200, As for the second sensor unit 240, the infrared ray detection elements 242A and 242B each having a FOV of 90 degrees are housed and fixed in holding cases 241 that are each independent, and are arranged in a similar manner to the infrared ray detection elements 232A and 232B. The second sensor unit 240 is covered and held by a single case 260 having a substantially triangular column shape, similarly to the first sensor unit 230. The second sensor unit 240 is configured to be movable vertically with respect to the base unit 200.

In the present embodiment, when a user operates vertically each of slide operation parts 244 having slide knobs 244A and 244B shown in FIG. 5, the infrared ray detection elements 242A and 242B of the second sensor unit 240 can move vertically to predetermined positions independently on the right and left in the single case 260 having a substantially triangular column shape shown in FIG. 5. Since the infrared ray detection elements 242A and 242B can move to the predetermined positions in the single case 260 having a substantially triangular column shape shown in FIG. 5, a detection distance (warning distance) can be finely adjusted according to the predetermined positions.

By the above configuration, the detection center directions P1 of the infrared ray detection element 232A and the infrared ray detection element 242A shown in FIG. 6A are substantially the same in the right and left direction, and the detection center directions P2 of the infrared ray detection element 232B and the infrared ray detection element 242B are substantially the same in the right and left direction. Here, the infrared ray detection element 232A (232B) is located at a position at which the infrared rays from the Fresnel lens 120A1 (120B1) and 120A2 (120B2) among the respective lens pieces shown in FIG. 6B included in the lens part 120A (120B) shown in FIG. 2 can be concentrated. The infrared ray detection element 242A (242B) is also located at a position at which the infrared rays from the Fresnel lenses 120A3 (120B3) among the respective lens pieces of the lens part 120A (120B) shown in FIG. 2 can be concentrated.

In the present embodiment, the security sensor device 1 is configured to perform each of two detections of low-place mounting detection in which the security sensor device 1 is mounted at a low place equal to or lower than a predetermined height and human body detection is performed and high-place mounting detection in which the security sensor device 1 is mounted at a place higher than the predetermined height and human body detection is performed, by one device. For this reason, it is possible to perform a switching operation for changing a configuration between each of the plurality of sensor units 230 and 240 and the plurality of optical systems 120A1-120A3 and 120B1-120B3 according to a user operation. The security sensor device 1 includes a switching unit K for the switching operation.

Specifically, the visual field restriction member 220 of the present embodiment can block at an upper half part a part (specifically, a lower part) of a visual field of a predetermined infrared ray detection element, i.e., the infrared ray detection elements 232A and 232B of the first sensor unit 230, for example. At this time, the switching unit K is configured to change a relative position in the vertical arrangement direction between the infrared ray detection elements 232A and 232B and the visual field restriction member 220 so as to change a configuration between each of the plurality of sensor units 230 and 240 and the plurality of optical systems 120A1-120A3 and 120B1-120B3. Thereby, the switching unit K performs a first operation of positioning the infrared ray detection elements 232A and 232B at a first position PO1 and arranging the visual field restriction member 220 at a position at which the visual fields of the infrared ray detection elements 232A and 232B are not blocked to change a positional correspondence between the detection rays transmitting the detection lens 120 and the infrared ray detection elements 232A and 232B on which the detection rays are incident. In this state, the security sensor device 1 can perform the high-place mounting detection having a lower detection area. Additionally, the switching unit K of the present embodiment is configured to perform the positioning and the changing of the correspondence at the same time in the first operation, according to the user operation.

In the present embodiment, the two secondary mirrors 226A and 226B (FIG. 3) can each reflect detection rays directed toward the infrared ray detection elements 242A and 242B of the second sensor unit 240. That is, the secondary mirrors 226A and 226B are each rested on parts of the visual fields of the infrared ray detection elements 242A and 242B. At this time, the switching unit K is configured to change a configuration between each of the plurality of sensor units 230 and 240 and the plurality of optical systems 120A1-120A3 and 120B1-120B3. Thereby, the switching unit K performs a second operation of positioning the infrared ray detection elements 242A and 242B at a second position and arranging the secondary mirrors 226A and 226B at positions included in the visual fields of the infrared ray detection elements 242A and 242B to change a positional correspondence between the detection rays transmitting the detection lens 120 and the infrared ray detection elements 242A and 242B on which the detection rays are incident, by changing a relative position in the vertical arrangement direction between the infrared ray detection elements 242A and 242B and the secondary mirrors 226A and 226B. In this state, the security sensor device 1 can perform the high-place mounting detection. Additionally, the switching unit K of the present embodiment is configured to perform the positioning and the changing of the correspondence at the same time in the second operation, according to the user operation.

In the present embodiment, as described above, the switching unit K is configured to perform the first operation and the second operation at the same time in the first sensor unit 230 and the second sensor unit 240, according to the user operation. The user operation is such that the user grips and moves a knob 250 (refer to FIG. 4) attached to the single case 260 having a substantially triangular column shape in the upper and lower direction that is the predetermined arrangement direction, thereby sliding the integrated first sensor unit 230 and second sensor unit 240 in the upper and lower direction.

More specifically, in a state where the security sensor device 1 can perform the low-place mounting detection, when the knob 250 is moved up, the infrared ray detection elements 232A and 232B of the first sensor unit 230 are moved upward and positioned at the first position PO1 for the high-place mounting detection, and at the same time, the visual field restriction member 220 is moved downward to a position for the high-place mounting detection at which the visual fields of the infrared ray detection elements 232A and 232B are not blocked (refer to FIG. 4), from the state where the high-place mounting detection is possible toward the state where the low-place mounting detection is possible. When the knob 250 is moved down, the infrared ray detection elements 232A and 232B are moved down, and at the same time, the visual field restriction member 220 is moved upward deviating from the position at which the visual fields of the infrared ray detection elements 232A and 232B are not blocked (refer to FIG. 5). Note that, the position of the visual field restriction member 220 at which the visual fields of the infrared ray detection elements 232A and 232B are not blocked may also include a position at which small parts of the infrared ray detection elements 232A and 232B are blocked, except a case where the effects of the present embodiment to be described later are considerably deteriorated.

Figure 4:
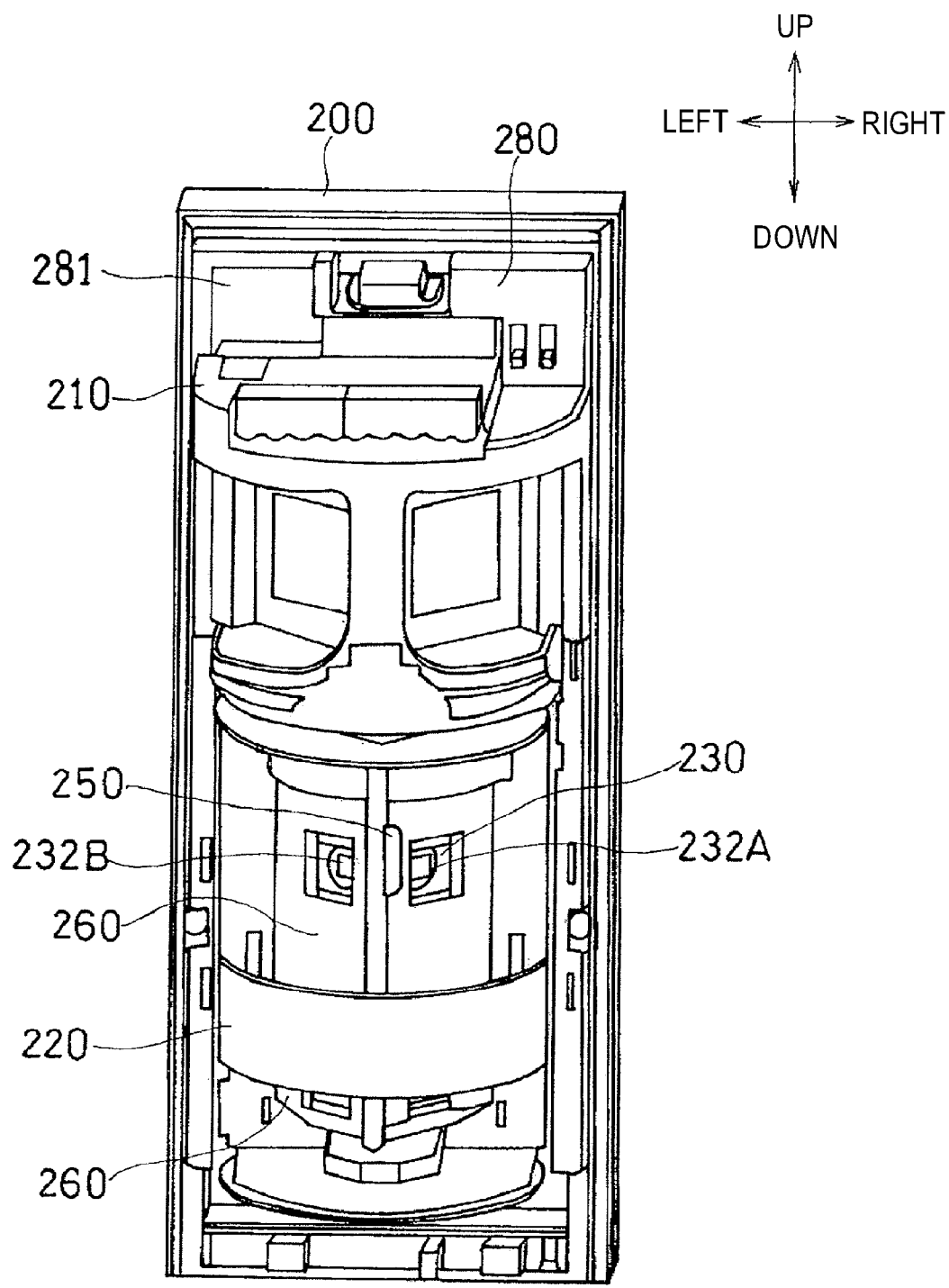
FIG. 4 is a perspective top view of a base unit of the security sensor device (in a case of high-place mounting).

Similarly, in a state where the security sensor device 1 can perform the low-place mounting detection, when the knob 250 is moved up, the infrared ray detection elements 242A and 242B of the second sensor unit 240 are moved upward or downward and fixed at the second position PO2 for the high-place mounting detection, according to any position where the detection distance (warning distance) is adjusted by the vertical movement due to a user operation on the slide operation part 244, and at the same time, the secondary mirrors 226A and 226B are moved downward to a position for the high-place mounting detection included in the visual fields of the infrared ray detection elements 242A and 242B, in conformity to the movement of the visual field restriction member 220 (refer to FIG. 4). When the knob 250 is moved down, the position-fixed state of the infrared ray detection elements 242A and 242B at the second position PO2 is released, and at the same time, the secondary mirrors 226A and 226B are moved upward deviating from the positions included in the visual fields of the infrared ray detection elements 242A and 242B, in conformity to the movement of the visual field restriction member 220 (refer to FIG. 5), from the state where the high-place mounting detection is possible toward the state where the low-place mounting detection is possible.

As described above, when the user vertically operates the slide knobs 244A and 244B shown in FIG. 5, the infrared ray detection elements 242A and 242B are independently moved to arbitrary positions in the upper and lower direction on the inner side covered by the single case 260 having a substantially triangular column shape, as the second sensor unit 240 but can be used in the case of the low-place mounting detection, in the present embodiment. That is, when the first operation and the second operation, which will be described later, are performed and the state of the high-place mounting detection is thus formed according to the user operation, the infrared ray detection elements 242A and 242B of the second sensor unit 240 shown in FIG. 6B are moved from the arbitrary positions to the second position PO2. Specifically, in the present embodiment, when the second operation is performed by the user operation on the knob 250, the infrared ray detection elements 242A and 242B are moved from the arbitrary positions to the second position PO2.

More specifically, the visual field restriction member 220 is moved vertically along the main body 210 of the base unit 200 between a lower position at which the visual fields of the infrared ray detection elements 232A and 232B are not blocked and an upper position at which parts of the visual fields of the infrared ray detection elements 232A and 232B can be blocked, according to the user operation on the knob 250 in the upper and lower direction. In addition, since the visual field restriction member 220 has the secondary mirrors 226A and 226B, the secondary mirrors 226A and 226B are moved vertically along the main body 210 of the base unit 200 between a lower position included in the visual fields of the infrared ray detection elements 242A and 242B and an upper position deviating from the position included in the visual fields of the infrared ray detection elements 242A and 242B, according to the user operation on the knob 250 in the upper and lower direction. In the present embodiment, the switching unit K shown in FIG. 5 is configured by the knob 250 (FIG. 4) (which will be described later) and a structure (not shown) for joint movement and positioning to two upper and lower places between the first position PO1 and second position PO2 and the lower position. The structure by which the switching unit K can perform the first operation and the second operation at the same time according to the user operation on the knob 250 and the structure by which the infrared ray detection elements 242A and 242B can be moved from the predetermined positions to the second position PO2 can be implemented by any well-known method using a slide structure, a joint movement structure and the like, for example.

[Operational Effects]

As for the security sensor device of the present embodiment, operational effects thereof are described. Since the security sensor device of the present embodiment includes the AND circuit (human body detection circuit 280) configured to perform the AND operation, it is possible not only to accurately detect a human body with excluding false detection but also to switch the high-place mounting detection and the conventional low-place mounting detection by operations of the first operation and the second operation, which will be described later. Note that, the descriptions of the infrared ray detection elements 232A and 242A whose detection center directions P1 are substantially the one same direction shown in FIG. 6A in the right and left direction and the descriptions of the infrared ray detection elements 232B and 242B whose detection center directions P2 are substantially the other same direction in the right and left direction are very similar in the upper and lower direction and in the front and rear direction, except that the target directions are different in the right and left direction. Therefore, in the below, the infrared ray detection elements 232A and 242A and the right configuration relating to the same (for example, the lens part 120A and the like) are mainly described, and the descriptions of the infrared ray detection elements 232B and 242B and the left configuration relating to the same (for example, the lens part 120B and the like) are omitted.

[High-Place Mounting Detection]

When the infrared ray detection element 232A is moved upward and positioned at the first position PO1 in the first sensor unit 230, and at the same time, the visual field restriction member 220 is moved downward to a position at which the visual field of the infrared ray detection element 232A is not blocked, as the knob 250 shown in FIG. 5 is moved up, detection rays from a direction of one detection area RH1 (in this case, the detection rays are referred to as H1 direction detection rays) slightly below a horizontal direction including a target direction H1 and a direction of one detection area RH3 (in this case, the detection rays are the above-described lower detection rays and are referred to as H3 direction detection rays) below a horizontal direction including a target direction H3 are included in the FOV of the infrared ray detection element 232A, as shown in FIG. 6B. Note that, the detection area RH1 may also be one detection area below the horizontal direction. The H1 direction detection rays reach the infrared ray detection element 232A through the Fresnel lens 120A1. Note that, the H3 direction detection rays also reach the infrared ray detection element 232A through the Fresnel lens 120A2. Here, FIG. 6B is a sectional view taken along a line VIB-VIB of FIG. 6A. Note that, in FIG. 6B, for easy seeing, the detailed structure of the right half in the base unit 200 is not shown, and only the vicinity of the infrared ray detection elements is shown.

When the infrared ray detection element 242A is moved up and positioned at the second position PO2 in the second sensor unit 240 according to any position before the knob 250 is moved up, and at the same time, the secondary mirror 226A is moved downward to a position included in the visual field of the infrared ray detection element 242A in conformity to movement of the visual field restriction member 220, as the knob 250 (FIG. 5) is moved up, detection rays from a direction of one detection area RH2 below a horizontal direction including a target direction H2 and a direction of a detection area RH4 including a target direction H4 (in these cases, the detection rays are the lower detection rays and are each referred to as H2 direction detection rays and H4 direction detection rays) are included in the FOV of the infrared ray detection element 242A, as shown in FIG. 6B. Both the H2 direction detection rays and the H4 direction detection rays reach the infrared ray detection element 242A through the Fresnel lens 120A3. Here, the detection area RH4 is positioned closer to the security sensor device 1 than the detection area RH2, and the H4 direction detection rays transmit the Fresnel lens 120A3, are reflected on the secondary mirror 226A and then reach the infrared ray detection element 242A.

Figure 8:
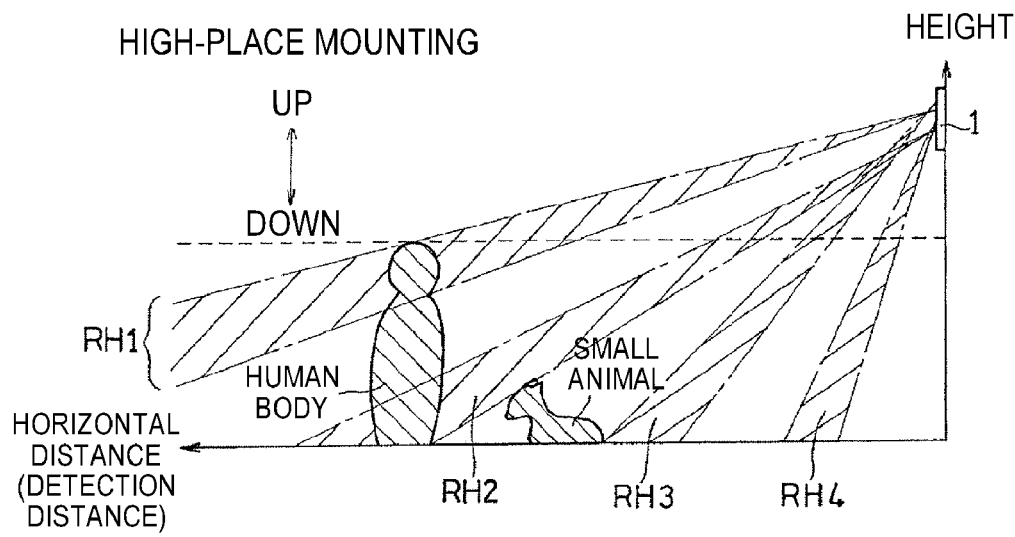
FIG. 8 is a side view for illustrating operations of the high-place mounting detection of the security sensor device.

In FIG. 6B, it is shown that the H1 direction detection rays to the H4 direction detection rays pass through the infrared ray detection elements 232A and 242A and the centers of the Fresnel lenses 120A1 to 120A3, respectively. As shown in FIG. 8, the detection areas RH1 to RH4 are positioned in corresponding order from sides more distant from the security sensor device 1, so that the H1 direction detection rays to the H4 direction detection rays have steeper downward angles with respect to the vertical direction (upper and lower direction). In this way, the detection areas RH1 to RH4 are a plurality of divided detection areas, and the high-place detection can be implemented by the H1 direction detection rays to the H4 direction detection rays corresponding to the detection areas RH1 to RH4. Therefore, the H1 direction detection rays and the H3 direction detection rays that reach the infrared ray detection element 232A, and the H2 direction detection rays and the H4 direction detection rays that reach the infrared ray detection element 242A are alternately adjacent in the vertical direction (or the upper and lower direction, the longitudinal direction of the drawing sheet) (such high-place detection rays are referred to as alternating high-place detection rays). Accordingly, it is possible to implement the accurate high-place mounting detection by the configuration where the adjacent detection areas capturing the detection rays have sufficient gaps with respect to a small animal on the floor (ground) where it is desired to exclude the false detection and by the detection by the AND operation.

[Low-Place Mounting Detection]

Figure 7A:
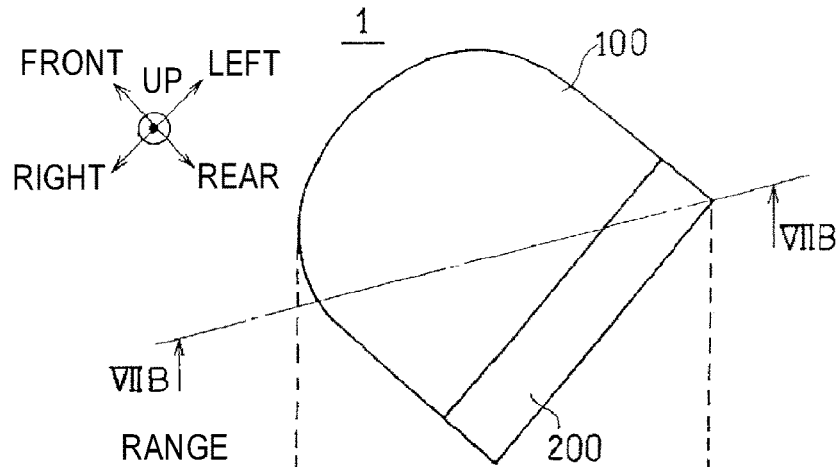
FIG. 7A is a plan view for illustrating low-place mounting detection of the security sensor device.
Figure 7B:
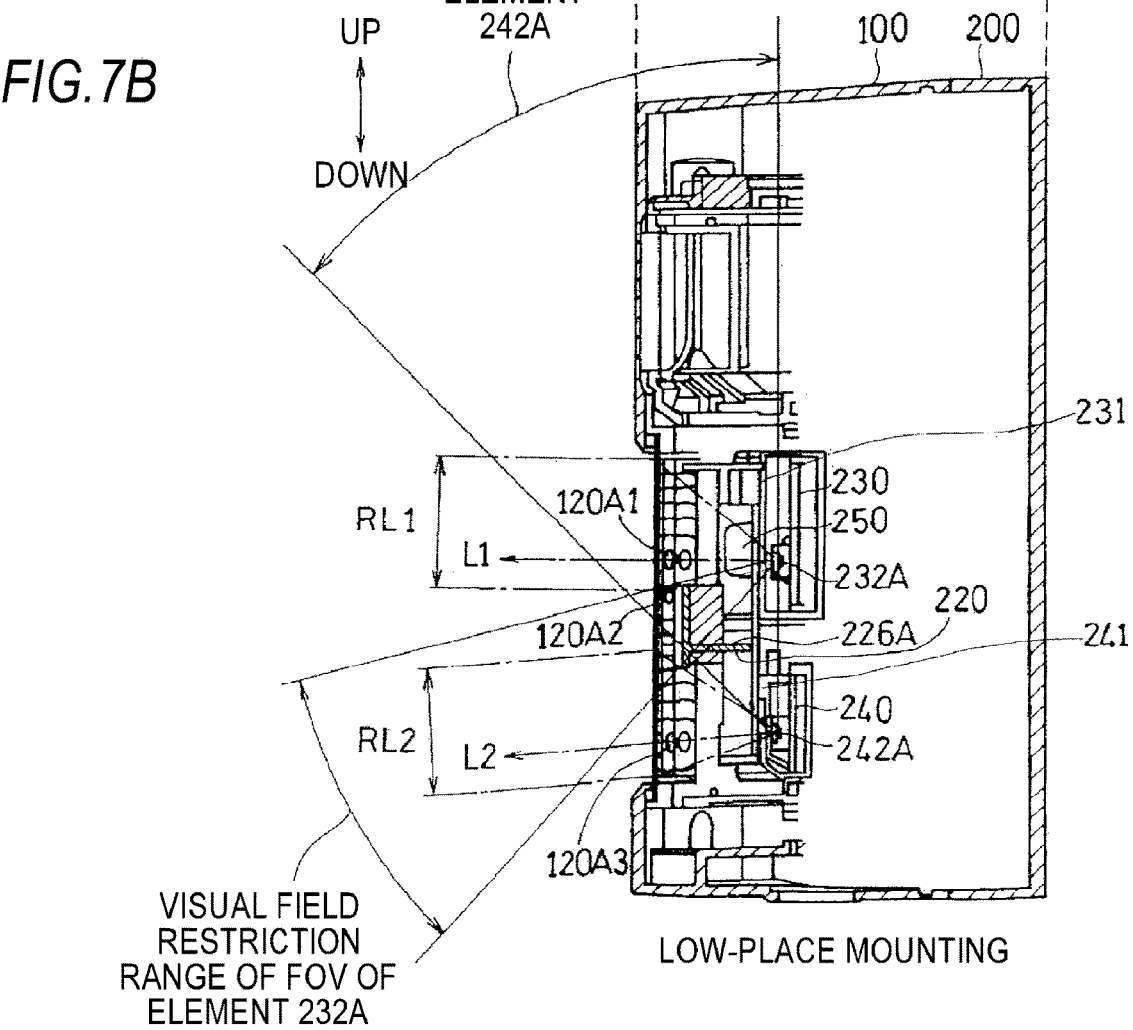
FIG. 7B is a sectional view taken along a line VIIB-VIIB in FIG. 7A.

When the infrared ray detection element 232A is moved downward in the first sensor unit 230, and at the same time, the visual field restriction member 220 is moved upward deviating from the position at which the visual fields of the infrared ray detection elements 232A and 232B are not blocked, from the state where the high-place mounting detection is possible to the state where the low-place mounting detection is possible, as the knob 250 is moved down, detection rays only from a direction of one detection area RL1 (in this case, the detection rays are horizontal direction detection rays and referred to as L1 direction detection rays) in a substantially horizontal direction including a target direction L1 are included in the FOV of the infrared ray detection element 232A, as shown in FIG. 7B. The L1 direction detection rays reach the infrared ray detection element 232A in the substantially horizontal direction through the Fresnel lens 120A1. That is, the visual field restriction member 220 is positioned at a position at which a part of a lower side of the visual field of the infrared ray detection element 232A is blocked, and specifically, blocks the detection rays transmitting the Fresnel lens 120A2 from reaching the infrared ray detection element 232A. Here, FIG. 7B is a sectional view taken along a line VIIB-VIIB in FIG. 7A. Note that, in FIG. 7B, for easy seeing, the detailed structure of the right half in the base unit 200 is not shown, and only the vicinity of the infrared ray detection elements is shown.

When the knob 250 (FIG. 5) is moved down, the position-fixed state of the infrared ray detection element 242A is released in the second sensor unit 240 and the slide knob 244A (slide operation part 244) can be operated in the upper and lower direction, from the state where the high-place mounting detection is possible to the state where the low-place mounting detection is possible. At the same time, when the secondary mirror 226A is moved upward deviating from the position included in the visual field of the infrared ray detection element 242A, in conformity to the movement of the visual field restriction member 220, detection rays only from a direction of one detection area RL2 (in this case, the detection rays are the lower detection rays and referred to as L2 direction detection rays) below a horizontal direction including a target direction L2 are included in the FOV of the infrared ray detection element 242A, as shown in FIG. 7B. The L2 direction detection rays reach the infrared ray detection element 242A through the Fresnel lens 120A3. That is, the secondary mirror 226A is outside of the visual field of the infrared ray detection element 242A, and specifically, even though the detection rays from the detection target are reflected on the secondary mirror 226A, the detection rays do not reach the infrared ray detection element 242A.

Figure 9:
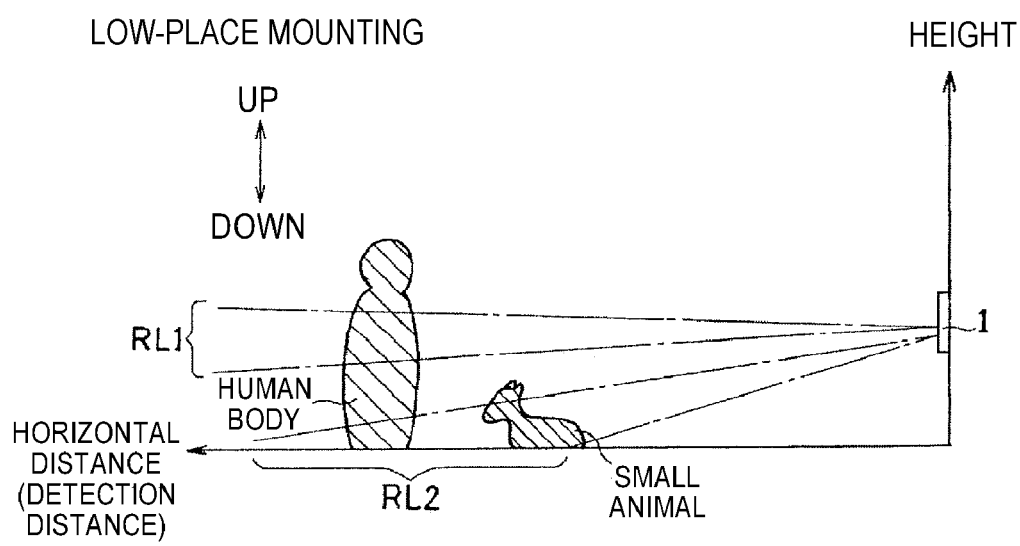
FIG. 9 is a side view for illustrating operations of the low-place mounting detection of the security sensor device.

In FIG. 7B, it is shown that the L1 direction detection rays and the L2 direction detection rays pass through the infrared ray detection elements 232A and 242A and the centers of the Fresnel lenses 120A1 and 120A3, respectively. As shown in FIG. 9, the detection areas RL1 and RL2 are positioned in corresponding order from sides more distant from the security sensor device 1, so that the L1 direction detection rays and the L2 direction detection rays have steeper downward angles with respect to the vertical direction (upper and lower direction). As described above, since the L1 direction detection rays reach the infrared ray detection element 232A and the L2 direction detection rays reach the infrared ray detection element 242A in FIG. 7B, the detection targets are detected by the AND operation for the detection areas RL1 to RL2.

As shown in FIG. 8, in the high-place mounting detection of the present embodiment, the number of the detection areas is larger, as compared to the low-place mounting detection shown in FIG. 9. In addition, in the high-place mounting detection of the present embodiment, each of the detection rays has the steeper downward angle with respect to the vertical direction (upper and lower direction), as compared to the low-place mounting detection.

Note that, among the plurality of changes in relative position due to the first operation and the second operation, the magnitudes of the changes in position may be different between the change in relative position due to the first operation and the change in relative position due to the second operation. This is because a first distance in the change in relative position when the infrared ray detection elements 232A and 232B are moved to the first position PO1 and the visual field restriction member 220 is moved to the position at which the visual fields of the infrared ray detection elements 232A and 232B are not blocked and a second distance in the change in relative position when the infrared ray detection elements 242A and 242B are moved to the second position PO2 and the secondary mirrors 226A and 226B are moved to the positions included in the visual fields of the infrared ray detection elements 242A and 242B are not the same in most cases and the first and second distances for implementing the alternating high-place detection rays are not the same in most cases.

As described above, the security sensor device 1 of the present embodiment can solve the drawbacks of the conventional art, implement the high-place mounting detection and the low-place mounting detection by one device, and accurately detect a human body with excluding the false detection.

Although the preferred embodiment has been described with reference to the accompanying drawings, the present invention is not limited to the embodiment, and a variety of additions, changes and deletions can be made without departing from the gist of the present invention. Therefore, such additions, changes and deletions are also included within the scope of the present invention. For example, the following configurations can also be included therein.

In the above embodiment, the sensor unit 230 configured to be switched by the switching unit K and to perform the first operation and the sensor unit 240 configured to be switched by the switching unit K and to perform the second operation are provided. However, both the sensor units 230 and 240 may also be sensor units configured to be switched by the switching unit K and to perform the first operation. In this case, the switching unit K may be configured to perform the first operation of the sensor units 230 and 240 at the same time according to the user operation. Also, both the sensor units 230 and 240 may be sensor units configured to be switched by the switching unit K and to perform the second operation. In this case, the switching unit K may be configured to perform the second operation of the sensor units 230 and 240 at the same time according to the user operation.

Also, the positional relation of the sensor units 230 and 240 in the upper and lower direction may be reversed, and the number of the sensor units is not limited to two and may be three or more. In this case, the three or more sensor units may each be any one of a sensor unit configured to be switched by the switching unit K and to perform the first operation and a sensor unit configured to be switched by the switching unit K and to perform the second operation.

REFERENCE SIGNS LIST

1, 1A security sensor device
100 cover unit
120A1, 120A2, 120A3 Fresnel lenses ((a plurality of) optical systems)
120B1, 120B2, 120B3 Fresnel lenses ((a plurality of) optical systems)
200 base unit
220 visual field restriction member
226A, 226B secondary mirror
232A, 232B infrared ray detection element
242A, 242B infrared ray detection element
280 human body detection circuit
K switching unit
PO1 first position
PO2 second position

The invention claimed is:
1. A security sensor device comprising:
a plurality of sensor units each of which includes an infrared ray detection element having a visual field in a predetermined target direction, the plurality of sensor units aligned in a predetermined arrangement direction;
a plurality of optical systems through which detection rays transmit from a corresponding detection area to each infrared ray detection element, the plurality of optical systems aligned in the predetermined arrangement direction;
a target object detection circuit into which an output signal is input from each infrared ray detection element, the target object detection circuit configured to output a target object detection signal including a signal indicating detection of a detection target based on each output signal; and
a switching unit which is configured to change a configuration between each of the plurality of sensor units and the plurality of optical systems according to a user operation, so that two detections of low-place mounting detection and high-place mounting detection are respectively performed, the low-place mounting detection in which the security sensor device is mounted at a low place equal to or lower than a predetermined height and human body detection is performed, the high-place mounting detection in which the security sensor device is mounted at a place higher than the predetermined height and human body detection is performed.

2. The security sensor device according to claim 1, further comprising: a visual field restriction member which is configured to block a part of the visual field of the predetermined infrared ray detection element, wherein
the switching unit is configured to perform a first operation of positioning the infrared ray detection element at a first position and arranging the visual field restriction member at a position at which the visual field of the infrared ray detection element is not blocked to change a positional correspondence between the detection rays transmitting the optical system and the infrared ray detection element on which the detection rays are incident, by changing a relative position in the predetermined arrangement direction between the infrared ray detection element and the visual field restriction member.

3. The security sensor device according to claim 2, wherein the switching unit is configured to perform the positioning and the changing of the correspondence at the same time in the first operation according to the user operation.

4. The security sensor device according to claim 2, wherein the security sensor device includes a plurality of the sensor units each configured to be switched by the switching unit to perform the first operation, and
wherein the switching unit is configured to perform the first operations of the plurality of sensor units at the same time according to the user operation.

5. The security sensor device according to claim 2, wherein
the infrared ray detection element can move to a predetermined position in the corresponding sensor unit according to a user operation, and
when the first operation or the second operation is performed according to the user operation, the infrared ray detection element moves from the predetermined position to the first position or the second position.

6. The security sensor device according to claim 2, wherein the visual field restriction member is a part of a cylindrical surface or a part of a polygonal tube, and is arranged at a position closer to the optical systems than the infrared ray detection element.

7. The security sensor device according to claim 4, wherein the change in relative position that occurs multiple times includes changes in position having different magnitudes.

8. The security sensor device according to claim 1, further comprising: a secondary mirror for reflecting the detection rays, wherein
the switching unit is configured to perform a second operation of positioning the infrared ray detection element at a second position and arranging the secondary mirror at a position included in the visual field of the infrared ray detection element to change a positional correspondence between the detection rays transmitting the optical system and the infrared ray detection element on which the detection rays are incident, by changing a relative position in the predetermined arrangement direction between the infrared ray detection element and the secondary mirror.

9. The security sensor device according to claim 8, wherein the switching unit is configured to perform the positioning and the changing of the correspondence at the same time in the second operation according to the user operation.

10. The security sensor device according to claim 8, wherein the security sensor device includes a plurality of the sensor units each configured to be switched by the switching unit to perform the second operation,
wherein the switching unit is configured to perform the second operations of the plurality of sensor units at the same time according to the user operation.

11. The security sensor device according to claim 1, further comprising: a visual field restriction member configured to block a part of the visual field of the predetermined infrared ray detection element; and a secondary mirror for reflecting the detection rays, wherein
the switching unit is configured:
to perform a first operation of positioning the infrared ray detection element at a first position and arranging the visual field restriction member at a position at which the visual field of the infrared ray detection element is not blocked to change a positional correspondence between the detection rays transmitting the optical system and the infrared ray detection element on which the detection rays are incident, by changing a relative position in the predetermined arrangement direction between the infrared ray detection element and the visual field restriction member;
to perform a second operation of positioning the infrared ray detection element at a second position and arranging the secondary mirror at a position included in the visual field of the infrared ray detection element to change a positional correspondence between the detection rays transmitting the optical system and the infrared ray detection element on which the detection rays are incident, by changing a relative position in the predetermined arrangement direction between the infrared ray detection element and the secondary mirror; and
to perform the first operation and the second operation at the same time according to the user operation.

12. The security sensor device according to claim 11, wherein the visual field restriction member and the secondary mirror are integrated.

* * * * *